United States Patent
Del Zotto

[19]

[11] Patent Number: 5,865,346
[45] Date of Patent: Feb. 2, 1999

[54] SELF-CONTAINED FUELING SYSTEM AND METHOD

[76] Inventor: William M. Del Zotto, 3130 Whitetail Ridge, Superior, Wis. 54880

[21] Appl. No.: 779,676

[22] Filed: Jan. 7, 1997

[51] Int. Cl.$^6$ .................................................. B65D 88/76
[52] U.S. Cl. ...................... 222/108; 220/571; 137/234.6; 137/312; 137/376; 141/86
[58] Field of Search ................................ 222/108, 71, 74, 222/75, 2, 14, 16, 24, 25; 137/234.6, 312, 376; 235/381; 141/86, 311 A; 220/571

[56] References Cited

U.S. PATENT DOCUMENTS

| | | |
|---|---|---|
| 3,931,497 | 1/1976 | Gentile et al. .......................... 235/61.7 |
| 4,395,627 | 7/1983 | Barker et al. . |
| 4,900,906 | 2/1990 | Pusic . |
| 4,986,446 | 1/1991 | Montgomery et al. . |
| 4,988,020 | 1/1991 | Webb . |
| 5,114,046 | 5/1992 | Bryant . |
| 5,285,914 | 2/1994 | Del Zotto . |
| 5,400,924 | 3/1995 | Brodie . |
| 5,538,052 | 7/1996 | Harp ........................................... 141/86 |
| 5,570,714 | 11/1996 | Magish .................................... 137/312 |

*Primary Examiner*—Steven O. Douglas
*Attorney, Agent, or Firm*—Palmatier, Sjoquist, Voigt & Christensen, P.A.

[57] ABSTRACT

An above-ground or below-ground, self-contained, fully-enclosed, unattended fueling apparatus for dispensing fuel in return for payment and accepting payment by credit-card or cash and providing primary and secondary fuel containment to protect the environment against overfills and spills consists of a reinforced concrete slab base, a concrete secondary containment vessel anchored to the slab base, a removable reinforced concrete cover closing the secondary containment vessel, a primary containment tank suspended from the cover, a fuel pump, and a credit-card reader. The containment vessel and slab with suspended tank being formed remote from the site of installation.

18 Claims, 5 Drawing Sheets

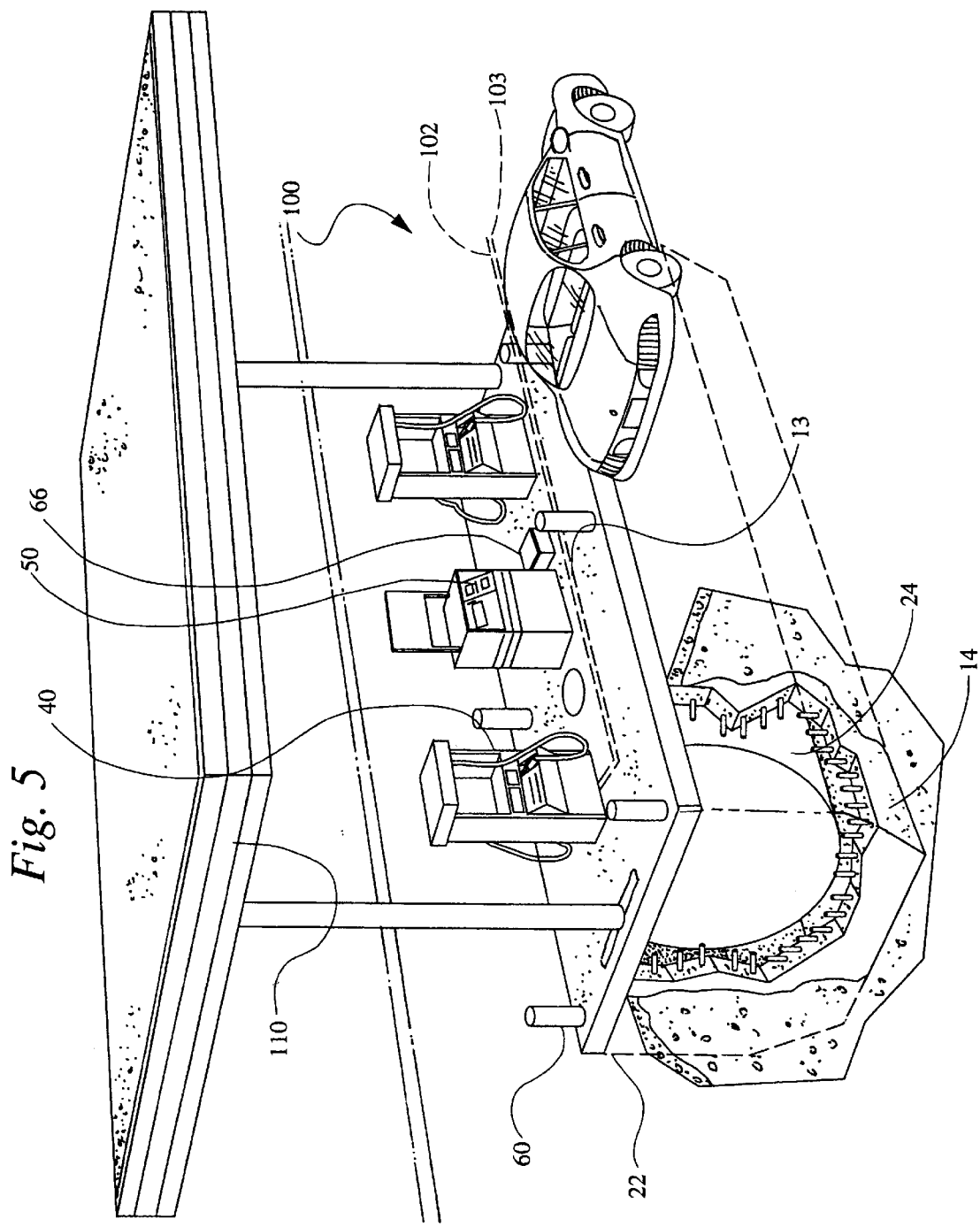

SELF-CONTAINED FUELING SYSTEM AND METHOD

BACKGROUND OF THE INVENTION

The present invention relates to fuel storage vessels and, in particular, to fuel storage vessels with a removable cover and with means of payment such as credit-card readers and cash receptors. A method of dispensing fuel with the fuel storage vessels is also disclosed.

A byproduct of society's increasing awareness of the environment and growing concerns regarding ground water contamination and the adverse effects of spilled petrochemicals (e.g. oil, gasoline, etc.) has been the institution of varieties of regulatory controls. The containment tank of the present invention was developed to accommodate such regulations, especially for circumstances requiring above-ground storage of gasoline. A further purpose was to accommodate concerns of the user to cost and repair or replacement of portions of the containment system.

Another concern motivating the present invention was that people taking to the road, woods and water in all-terrain vehicles (ATVs), 4×4's, dirt bikes, snowmobiles and watercraft need gas and an easy way to pay for it. Users such as the above want to refuel their vehicle at irregular times and/or at inaccessible locations where it would be prohibitive to staff the fuel facility with an attendant to take payment for the fuel or to install a conventional underground fuel system.

Above-ground fuel tank systems are known, such as are shown in the Brodie patent (U.S. Pat. No. 5,400,924) and the Bryant patent (U.S. Pat. No. 5,114,046). However, fuel tank systems like these suffer from a number of deficiencies.

First, the secondary containment vessels of such systems do not completely enclose the primary containment tank, so that it is possible for a major spill to overtop the secondary containment vessel and contaminate the environment. These vessels must be kept partially open in order to allow access to the primary containment tank and fuel hoses, which are located within the walls of the secondary containment vessel. This opens up the possibility of vandalism if such fuel tank systems are used in an unattended location, particularly a remote unattended location.

Second, these fuel tank systems do not provide an impermeable liner to the secondary containment vessel, so that any fuel leak will immediately contaminate the secondary containment vessel.

Third, these fuel tank systems do not provide protective barriers around the secondary containment vessel which prevent damage to the secondary containment vessel caused by collision with a vehicle.

Fourth, the fuel lines and electrical lines in these fuel tank systems are not protected against damage.

Fifth, these fuel tank systems do not provide any means for a driver to pay for the fuel, so these fuel tank systems must be staffed by an attendant.

Sixth, these fuel tank systems are not conducive to being partially buried due to the open secondary containment area and also due to the low weight to volume displaced ratio. The open secondary containment area limits the depth that convention dual containment fueling systems may be buried. When such containment systems are buried, the secondary containment area which is below ground level may collect water, debris, and animals leading to unsanitary and unsafe conditions. Moreover, where the ground is soaked with water or has a water table near the ground surface, such as an location adjacent to a lake, partially or fully buried traditional fuel tank systems may float upward due to their low volume to weight ratio. This is particularly true when the fuel tank is near empty or empty.

Conventional fueling systems utilizing above-ground or below ground tanks usually need a concrete base to be poured at the installation location. The poured on-site base will typically necessitate tearing up the concrete base to access the tank and/or any containment area for inspection or repairs.

There is a need for an improved, self-contained fueling system which overcomes the above deficiencies.

SUMMARY OF THE INVENTION

An above or below ground, self-contained, fully-enclosed, unattended fueling apparatus and method for dispensing fuel in return for payment and accepting payment by credit-card or cash and providing primary and secondary fuel containment to protect the environment against overfills and spills consists of a reinforced concrete slab base, a concrete secondary containment vessel anchored to the slab base, a removable reinforced concrete cover closing the secondary containment vessel, a primary containment tank suspended from the cover, a fuel pump, and a credit-card reader. The containment vessel and slab with suspended tank being pre-cast remote from the site of installation.

BRIEF DESCRIPTION OF THE DRAWINGS

FIG. 5 is a perspective view showing a below-ground embodiment of the present invention with a partial cut-away.

DETAILED DESCRIPTION OF THE PREFERRED EMBODIMENTS

Figure 1:
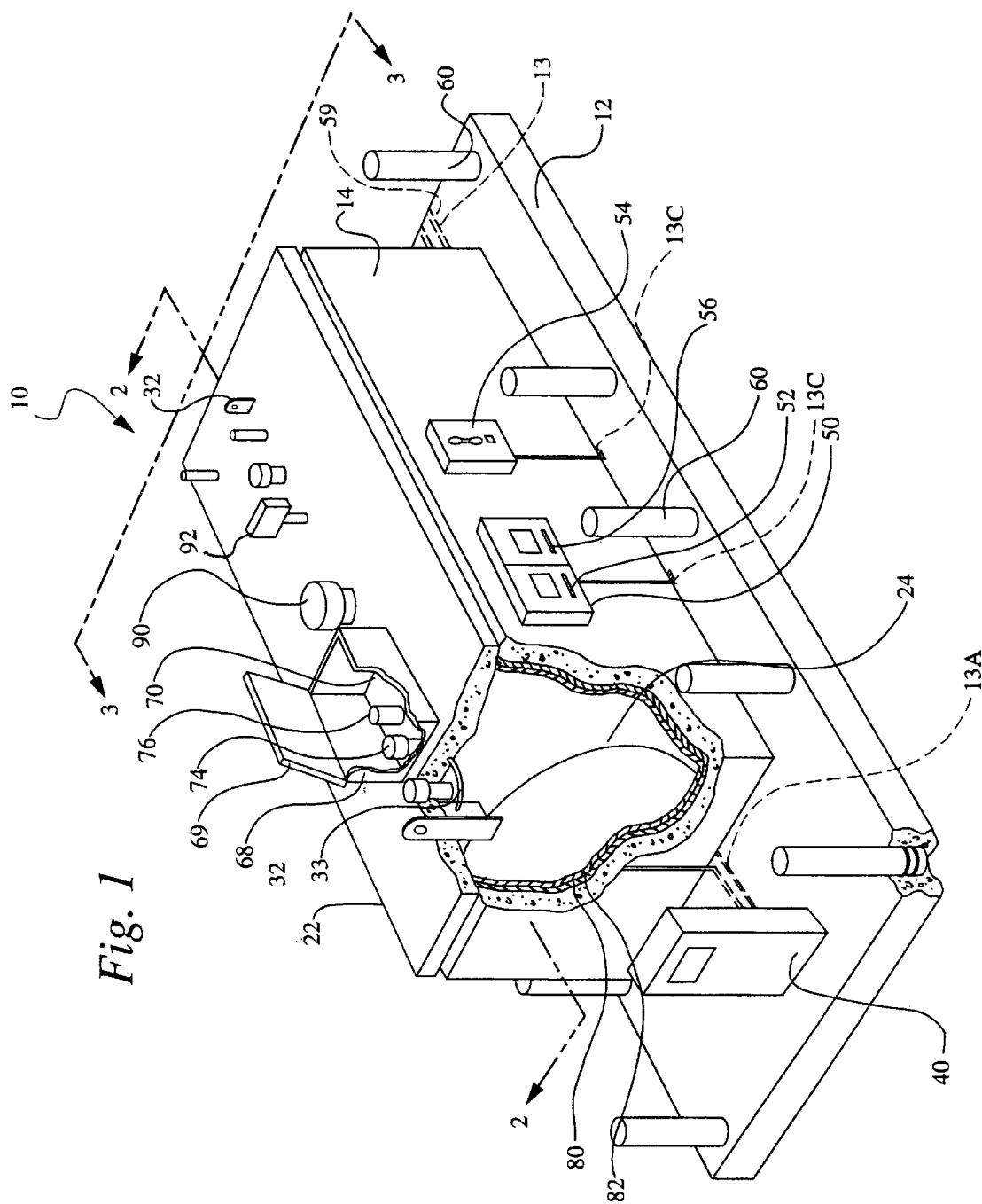
FIG. 1 is a perspective view shown in partial cutaway of the self-contained fueling system of the present invention.
Figure 2:
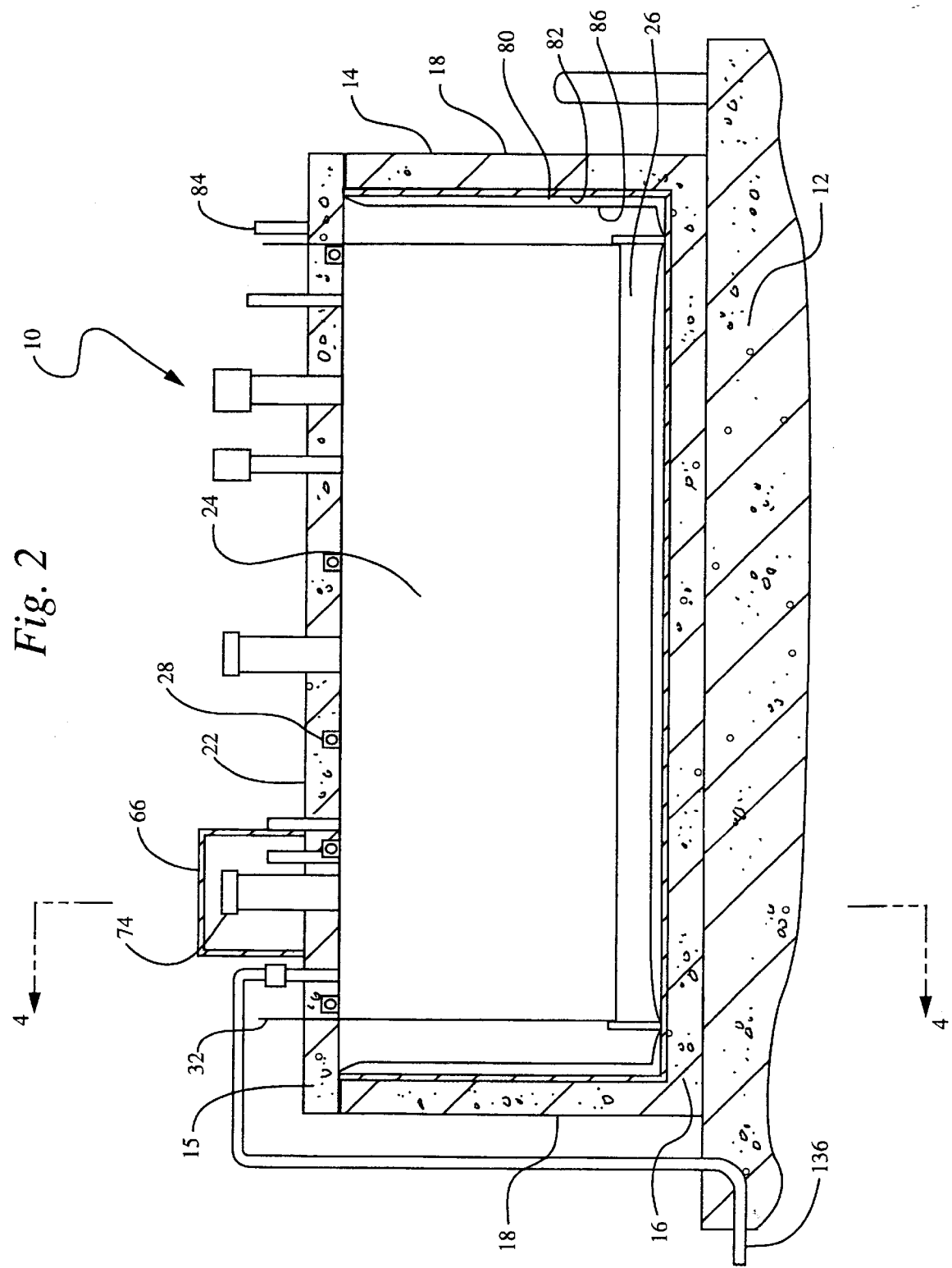
FIG. 2 is a cross-sectional view taken along section lines 2—2 of FIG. 1.
Figure 3:
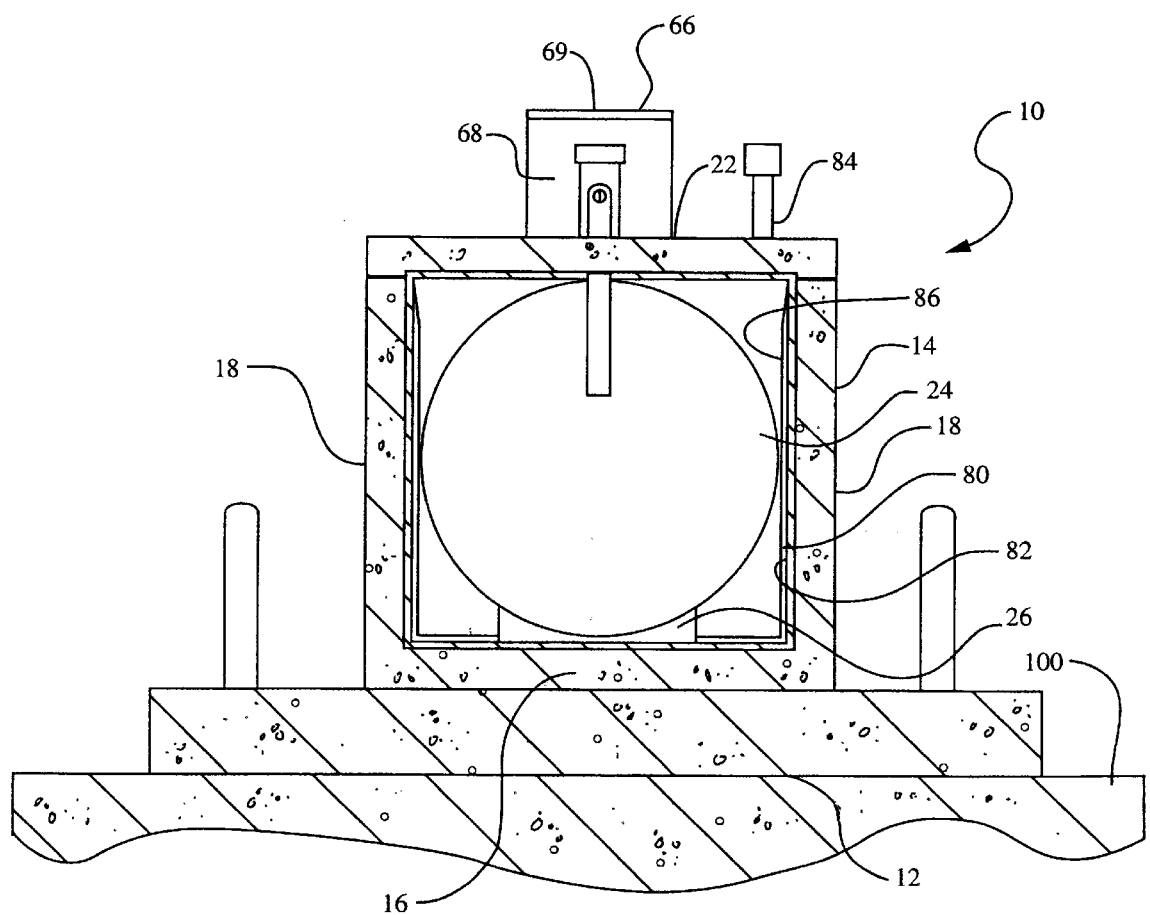
FIG. 3 is a cross-sectional view taken along section lines 3—3 of FIG. 1.

The self-contained fueling system of the present invention is generally shown in the Figures as reference numeral 10.

The self-contained fueling system 10 comprises, first, a pre-cast reinforced concrete slab base 12. A pre-cast concrete secondary containment vessel 14 positioned on or anchored to the slab base 12.

The secondary containment vessel 14 consists of a bottom 16 and four sides 18 of reinforced concrete. Preferably, the bottom 16 and four sides 18 are integral with one another as may be achieved by pre-forming the secondary containment vessel 14. Preferably, the secondary containment vessel 14 is monolithically cast in a single pour and includes a number of reinforcing members 15 such as rebar.

In the preferred embodiment, a removable reinforced concrete cover 22 engages the secondary containment vessel 14 and closes the secondary containment vessel 14.

A primary containment tank 24 is secured to and suspended from the cover 22. For the construction shown, the tank 24 is formed of metal; although it could be constructed of any material impervious to the stored fuel and capable of sustaining the physical loading. A number of cradles 26 may be secured to the tank 24 or to the secondary containment vessel 14 to support the tank 24 above the bottom 16.

Preferably, the cover 22 and tank 24 are secured to each other via bored weldments 28 that are welded to the tank 24 and integrated into the network of reinforcing members 15 that are cast into the cover 22. Thus, upon pouring the cover concrete, the cover 22 and tank 24 become a single assembly 30.

Preferably, a number of eyelets 32 are secured to the cover 22. The eyelets 32 facilitate placement and removal of the tank-cover assembly 30. In the preferred construction, the eyelets 32 are bonded to the tank 24 as part of the assembly 30.

Although the cover 22 is pre-cast in place with the tank 24, the cover 22 can be cast with appropriate brackets extending from the top cover 22 for connecting the tank 24. In such a construction, the cover 22 and tank 24 may be separately replaced.

However, the cover 22 and tank 24 are preferably formed together as a single unit 30. A principle reason is that by casting the cover 22 with the tank 24 as a single assembly 30, the assembly 30 and secondary containment vessel 14 self-align to one another with the fitting of one to the other. Thus, it is not necessary to either rotate the tank 24 or shift the tank 24 laterally or longitudinally within the secondary containment vessel 14 to provide a proper fit between the cover 22 and the secondary containment vessel 14. An integral assembly also serves to prevent flotation and shifting of the tank 24, if leakage or other fluid collects in the secondary containment vessel 14.

It will be seen that the secondary containment vessel 14 and cover 22 fully enclose the tank 24. This prevents vandalism to the tank 24, which might occur in an unattended facility in a remote location. As will be further seen, the secondary containment vessel 14 and cover 22 also provide secondary containment for the fuel in the tank 24. It is thus not possible, as in prior fueling systems, for a major spill to overtop the secondary containment vessel 14 and thus contaminate the environment. There is no need, as in earlier systems, to keep the secondary containment vessel 14 open for access to the tank 24, because the tank 24 can be removed from the secondary containment vessel 14 for servicing.

The self-contained fueling system 10 also includes a fuel pump 40 preferably attached to the slab base 12. The fuel pump 40 may preferably be a conventional service station type fuel pump. As will be seen, all electrical connections to the pump 40 and fuel pipes between the tank 24 and pump 40 are protected within conduits in the slab base 12.

One attractive feature of a fueling system constructed according to the invention is its capability to accommodate self-service refueling by accepting major commercial credit cards. To effect this capability, an user operable payment receiving device such as a credit card reader 50 is provided to the fueling system 10. A receipt printer 52 may be provided to provide a tangible verification of the refueling transaction for the purchaser's financial records. A telephone 54 may be provided in order to enable the purchaser to communicate any inquiries or complaints to a central customer support facility. There is thus no need for an attendant to staff the fueling system 10, which is particularly advantageous in remote locations. A cash receptor 56 is an alternative payment receiving device which may also be provided to allow payment by cash.

Because the fueling system 10 includes a pump 40 and credit card reader 50, it may be made fully operational for unattended operation merely by connecting electrical power and a telephone line to the fueling system 10 at a connecting port 59 shown on FIG. 1.

Preferably, the slab base 12 has pre-formed conduits 13 for electrical connections 13a, fuel pipes 13b, and a telephone line 13c. This construction prevents the electrical connections 13a, fuel pipes 13b, and telephone line 13c from any damage or vandalism and is a significant improvement over prior fueling systems.

To further protect the fueling system 10 against damage caused by vehicular collisions, the fueling system 10 may also include a plurality of posts or bollards 60 spaced at intervals on the slab base 12 so as to surround the secondary containment vessel 14 and protect the secondary containment vessel 14 from collision damage. Preferably, the bollards 60 are formed of concrete and are integral with the slab base 12. Alternately, the bollards 60 may be steel and attached to the base 12 by welding to the rebar during the casting of the slab or by suitable attachment brackets welded to the rebar.

Preferably, the fueling system 10 also has an overfill containment unit 66 with sides 68, a top cover 69, and a containment area 70. The interstitial area 86 functions as an overspill containment area 72. In the preferred embodiment, the overfill containment area 70 holds 15 or more gallons of fuel. Preferably, the overspill containment area 72 holds 25% of the volume of the primary containment tank 24. An overfill of 15 gallons is handled by the overfill containment area 70, which surrounds the fill pipe 74, and the overfill will drain directly back to the primary containment tank 24. If over fill continues, the excess fuel enters the overspill containment area 72 by a connection 76.

The fueling system 10 may also have an impermeable barrier 80 or liner within the secondary containment vessel 14. This impermeable barrier 80 may hold up to 125% of the volume of the primary containment tank 24. Preferably, the impermeable barrier 80 is constructed of a rubber or polyvinyl sheeting and is mounted between the tank 24 and the sides 18.

The impermeable barrier 80 may be spaced from the sides 18 and bottom 16 to form a tertiary space 82. Preferably, the tertiary space 82 is equipped with an inspection port 84 to detect fuel leaks into the tertiary space. The impermeable barrier 80 prevents a fuel leak from the primary containment tank 24 from contaminating the tertiary space and the walls 18 and bottom 16. Fuel leaking from the primary tank 24 may be retrieved from the interstitial space 86 between the primary tank 24 and the impermeable barrier 80.

The fueling system 10 also may include tank vents 90, a fill pipe and cap 74, and a fuel gauge 92. The tank vents 90, fill pipe and cap 74, and fuel gauge 92 extend from the primary containment tank 24 through the cover 22.

Figure 4:
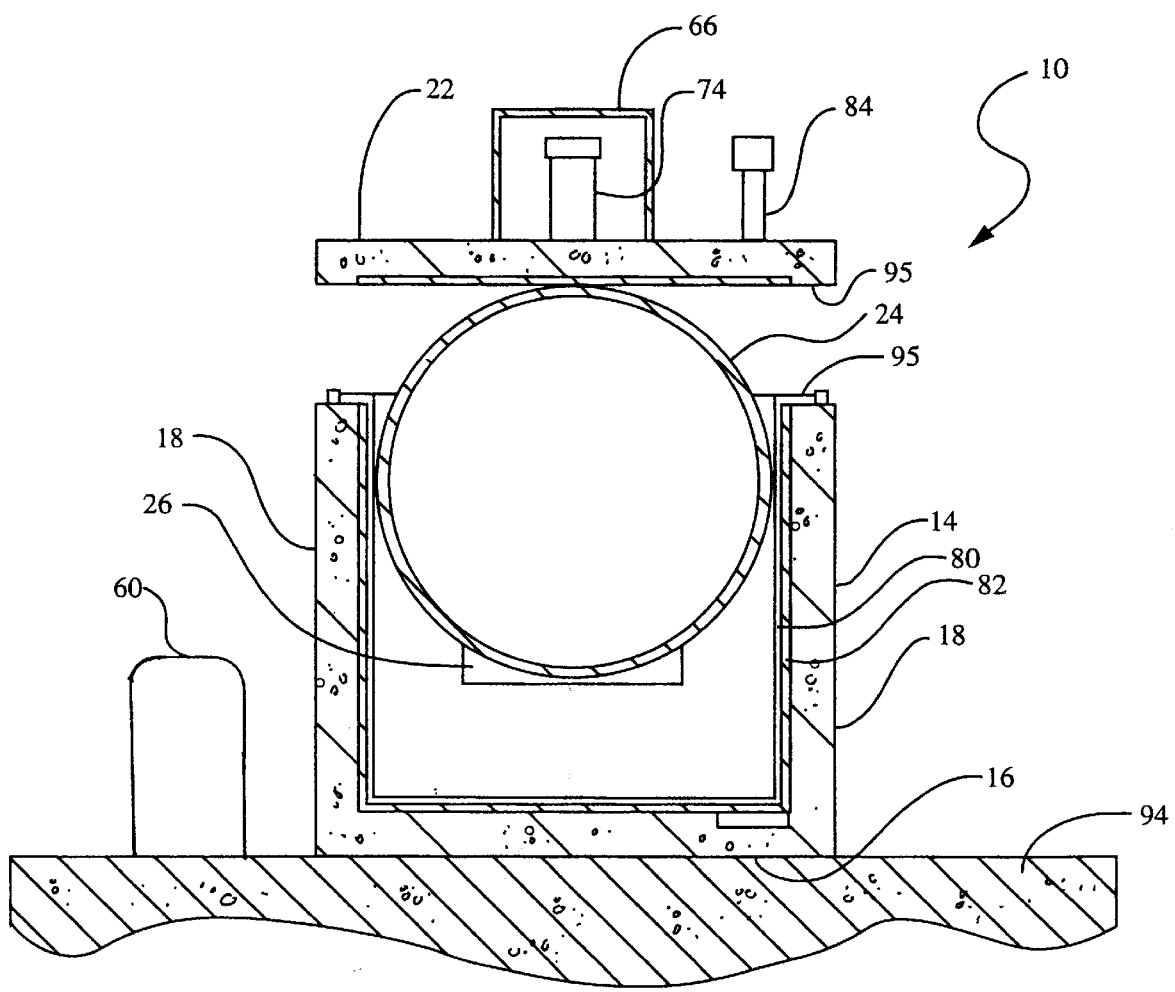
FIG. 4 is a cross-sectional elevational view showing the cover and primary containment tank raised from the secondary containment vessel and without the slab base.

The vessel 18 and cover 22 with suspended tank 24 are pre-cast at a manufacturing location 94 where the cover and tank assembled onto the vessel 18. See FIG. 4. Appropriate sealing material 95 is inserted between the top cover 22 and vessel 14. The slab also will typically be pre-cast at the manufacturing location with the appropriate conduits and attachment members for posts or other structures.

A second embodiment of the fueling system 10 is shown in FIG. 5 at an installation location 100. This is a below-ground embodiment. The detailed structure of the secondary containment vessel 14 and the cover 22 are substantially the same as the above-ground embodiment as shown in FIGS. 1–4, with certain exceptions. The reinforced concrete cover 22 functions as the slab base and supports the fuel dispenser 40. Also the appropriate conduits 13 for the telephone lines, fuel lines, and power lines are in the cover 22. The external underground phone line 102 and power line 103 are shown extending to the cover 22. Additionally, the posts and alternative attachment members 104 such as studs for securing structures such as a canopy 110 extend from the top cover 22. FIGS. 1–4 should be referenced and the above description should be understood to support the claims for this embodiment.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An above-ground, self-contained, fully enclosed, unattended fueling apparatus for dispensing fuel in return for payment and providing primary and secondary fuel containment to protect the environment against overfills and spills, comprising:
   a) a reinforced concrete slab base containing at least one pre-formed conduit for one of electrical connections and fuel pipes, the device further comprises electrical connections and fuel pipes, at least one of which is contained in said at least one conduit, whereby the electrical connections or fuel pipes contained in said conduit are protected from the environment and from collision damage from vehicles;
   b) a concrete secondary containment vessel anchored to said slab base, said secondary containment vessel comprising a bottom and four sides of reinforced concrete, said bottom and sides being integral with each other;
   c) a removable reinforced concrete cover engaging said secondary containment vessel and closing said secondary containment vessel;
   d) a primary containment tank secured to and suspended from said cover, whereby said tank is fully enclosed in the secondary containment vessel with the cover;
   e) a fuel pump attached to the apparatus; and
   f) a payment receiving device attached to said apparatus whereby said apparatus may be made operational by connecting electrical power to said apparatus.

2. The apparatus of claim 1, wherein said payment receiving device is a credit card reader.

3. The apparatus of claim 1, wherein said payment receiving device is a cash receptor.

4. The apparatus of claim 3, further comprising a credit card reader.

5. An above-ground, self-contained, fully enclosed, unattended fueling apparatus for dispensing fuel in return for payment and providing primary and secondary fuel containment to protect the environment against overfills and spills, comprising:
   a) a reinforced concrete slab base comprising a plurality of bollards spaced at intervals on said slab base and surrounding said secondary containment vessel and adapted to protect said secondary containment vessel from collision damage;
   b) a concrete secondary containment vessel anchored to said slab base, said secondary containment vessel comprising a bottom and four sides of reinforced concrete, said bottom and sides being integral with each other;
   c) a removable reinforced concrete cover engaging said secondary containment vessel and closing said secondary containment vessel;
   d) a primary containment tank secured to and suspended from said cover, whereby said tank is fully enclosed in the secondary containment vessel with the cover;
   e) a fuel pump attached to the apparatus; and
   f) a payment receiving device attached to said apparatus whereby said apparatus may be made operational by connecting electrical power to said apparatus.

6. The apparatus of claim 5, wherein said bollards are formed of concrete and are integral with said slab base.

7. An above-ground, self-contained, fully-enclosed, unattended fueling apparatus for dispensing fuel in return for payment and providing primary and secondary fuel containment to protect the environment against overfills and spills, comprising:
   a) a reinforced concrete slab base, wherein said slab base contains at least one pre-formed conduit for at least one of electrical connections, fuel pipes, and a telephone line, whereby the at least one of the electrical connections, fuel pipes and telephone line are protected from the environment and from collision damage from vehicles;
   b) a concrete secondary containment vessel anchored to said slab base, said secondary containment vessel comprising a bottom and four sides of reinforced concrete, said bottom and sides being integral with each other;
   c) a plurality of bollards spaced on said slab base and surrounding said secondary containment vessel and adapted to protect said secondary containment vessel from collision damage;
   d) a removable reinforced concrete cover engaging said secondary containment vessel and closing said secondary containment vessel;
   e) a primary containment tank secured to and suspended from said cover whereby said secondary containment vessel and said cover fully enclose said tank and provide secondary containment for the fuel in said tank;
   f) a fuel pump attached to said slab base; and
   g) a payment receiving device attached to said apparatus and whereby said apparatus may be made operational by connecting electrical power to said apparatus.

8. The apparatus of claim 7, wherein said bollards are formed of concrete and are integral with said slab base.

9. The apparatus of claim 7, further comprising an overfill containment area and an overspill containment area.

10. The apparatus of claim 9, wherein said overfill containment area holds 15 gallons of fuel.

11. The apparatus of claim 10, wherein said overspill containment area holds 25% of the volume of said primary containment tank.

12. The apparatus of claim 11, wherein excess fuel from said overfill containment area enters said overspill containment area.

13. The apparatus of claim 7, further comprising an impermeable barrier within said secondary containment vessel, said impermeable barrier holding up to 125% of the volume of the primary containment tank.

14. The apparatus of claim 13, wherein said impermeable barrier is spaced from said sides and said bottom to form a tertiary space, said tertiary space being equipped with an inspection port to detect fuel leaks.

15. The apparatus of claim 7, further comprising tank vents, a fill pipe and cap, and a fuel gauge, said tank vents, fill pipe, and fuel gauge extending from said primary containment tank through said cover.

16. The apparatus of claim 7, further comprising a cash receptor.

17. A method for constructing an above-ground, self-contained, fully enclosed fueling apparatus, comprising the steps of:

a) placing a reinforced concrete slab base at the dispensing site the slab base having pre-formed conduits therein;

b) anchoring a concrete secondary containment vessel to said slab base, said secondary containment vessel comprising a bottom and four sides of reinforced concrete, said bottom and sides being integral with each other;

c) securing a primary containment tank to a reinforced concrete cover and suspending said tank from said cover;

d) placing said cover on said secondary containment vessel, thereby closing said secondary containment vessel;

e) attaching a fuel pump to said slab base;

f) attaching a credit card reader and a cash receptor to one of said slab base and said secondary containment vessel; and g) extending one of electrical lines and a fuel line through the conduit in the slab base thereby protecting said electric lines and fuel line from the environment and from collision damage from vehicles.

18. The method of claim 17 further comprising the step of running all electrical connections, fuel pipes, and a telephone line through pre-formed conduits in said slab base, thereby protecting the electrical connections, fuel pipes, and telephone line from damage.

* * * * *